United States Patent
Winsor

(10) Patent No.: US 7,245,423 B1
(45) Date of Patent: Jul. 17, 2007

(54) REDUCING NOISE IN A FIBER AMPLIFIER USING A CLEANING OPTICAL SIGNAL

(75) Inventor: Robert Scott Winsor, Round Hill, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/491,237

(22) Filed: Jul. 24, 2006

(51) Int. Cl.
*H01S 3/00* (2006.01)
(52) U.S. Cl. .................................................. 359/337
(58) Field of Classification Search ............... 359/337
See application file for complete search history.

(56) References Cited

U.S. PATENT DOCUMENTS

| | | | | |
|---|---|---|---|---|
| 5,128,800 A * | 7/1992 | Zirngibl | .................... | 359/341.4 |
| 5,367,587 A | 11/1994 | Mizuochi et al. | | |
| 5,455,704 A | 10/1995 | Mizuochi et al. | | |
| 5,455,710 A * | 10/1995 | Takeda | .................... | 359/341.1 |
| 6,008,933 A | 12/1999 | Grubb et al. | | |
| 6,104,733 A * | 8/2000 | Espindola et al. | .............. | 372/6 |
| 6,226,117 B1 * | 5/2001 | Hentschel | .................... | 359/337 |
| 6,233,090 B1 | 5/2001 | Fukaishi | | |
| 6,256,328 B1 * | 7/2001 | Delfyett et al. | ................ | 372/23 |
| 6,480,318 B2 * | 11/2002 | Mori et al. | .................. | 359/264 |
| 6,529,317 B2 | 3/2003 | Choi et al. | | |
| 6,714,343 B2 * | 3/2004 | Goobar et al. | .............. | 359/337 |
| 6,731,426 B2 * | 5/2004 | Yeniay et al. | .......... | 359/341.32 |
| 6,771,414 B2 | 8/2004 | Masuda et al. | | |
| 6,859,606 B2 * | 2/2005 | Jiang et al. | .................. | 385/142 |
| 6,898,001 B2 * | 5/2005 | Ishihara et al. | ............. | 359/337 |
| 6,900,929 B2 * | 5/2005 | Minakawa | ................... | 359/337 |
| 7,039,283 B2 * | 5/2006 | Akasaka | ..................... | 385/123 |
| 2002/0141043 A1 * | 10/2002 | Flood | ......................... | 359/337 |
| 2003/0123134 A1 * | 7/2003 | Wada | ......................... | 359/337 |
| 2004/0240042 A1 * | 12/2004 | Charlet et al. | ............. | 359/337 |
| 2006/0082867 A1 * | 4/2006 | Starodoumov et al. | ..... | 359/337 |

* cited by examiner

*Primary Examiner*—Deandra M. Hughes
(74) *Attorney, Agent, or Firm*—Edell, Shapiro & Finnan, LLC

(57) ABSTRACT

A fiber amplifier system and method are provided for reducing noise produced by a fiber amplifier by combining an optical signal to be amplified with a continuous wave optical signal that stimulates ions in the fiber amplifier to reduce photons produced by spontaneous emission when a level of the optical signal of interest is very low or zero.

22 Claims, 4 Drawing Sheets

REDUCING NOISE IN A FIBER AMPLIFIER USING A CLEANING OPTICAL SIGNAL

FIELD OF THE INVENTION

The present invention relates to reducing noise in fiber amplifier devices.

BACKGROUND OF THE INVENTION

An Erbium Doped Fiber Amplifier (EDFA) is a fiber-based laser amplifier. The fiber is doped with Erbium ions (Er+), which have upper energy lifetimes on the order of 10 ms, for example. This, in addition to the wavelength of operation being pronounced from 1530 nm to 1570 nm, makes an EDFA ideally suited for long-haul fiber optic systems. The use of EDFAs has historically been applied most extensively to creating a strong transmitted signal, but it has also been used as a pre-amplifier for low signal level receivers. Their use as a low signal level pre-amplifier for optical communications has been limited by the noise figure of an EDFA. Due to the "on-off" nature of the optical signal level during optical communications, there are times when there is not (and should not be) any significant signal in the fiber. During these times, even though they may be extremely short duration, the Erbium ions remain in an excited state and are free to spontaneously emit at any time. Although there is high probability that a spontaneous emission will not occur during such a short period of time, any photon that is spontaneously emitted is amplified by the fiber, leading to significant noise.

A technique is needed to reduce the noise associated with spontaneous emissions in a fiber amplifier device.

SUMMARY OF THE INVENTION

Briefly, a fiber amplifier system and method are provided for reducing noise produced by a fiber amplifier by combining an optical signal to be amplified with a continuous wave optical signal that stimulates ions in the fiber amplifier to reduce photons produced by spontaneous emission when a level of the optical signal of interest is very low or zero.

DETAILED DESCRIPTION

Figure 1:
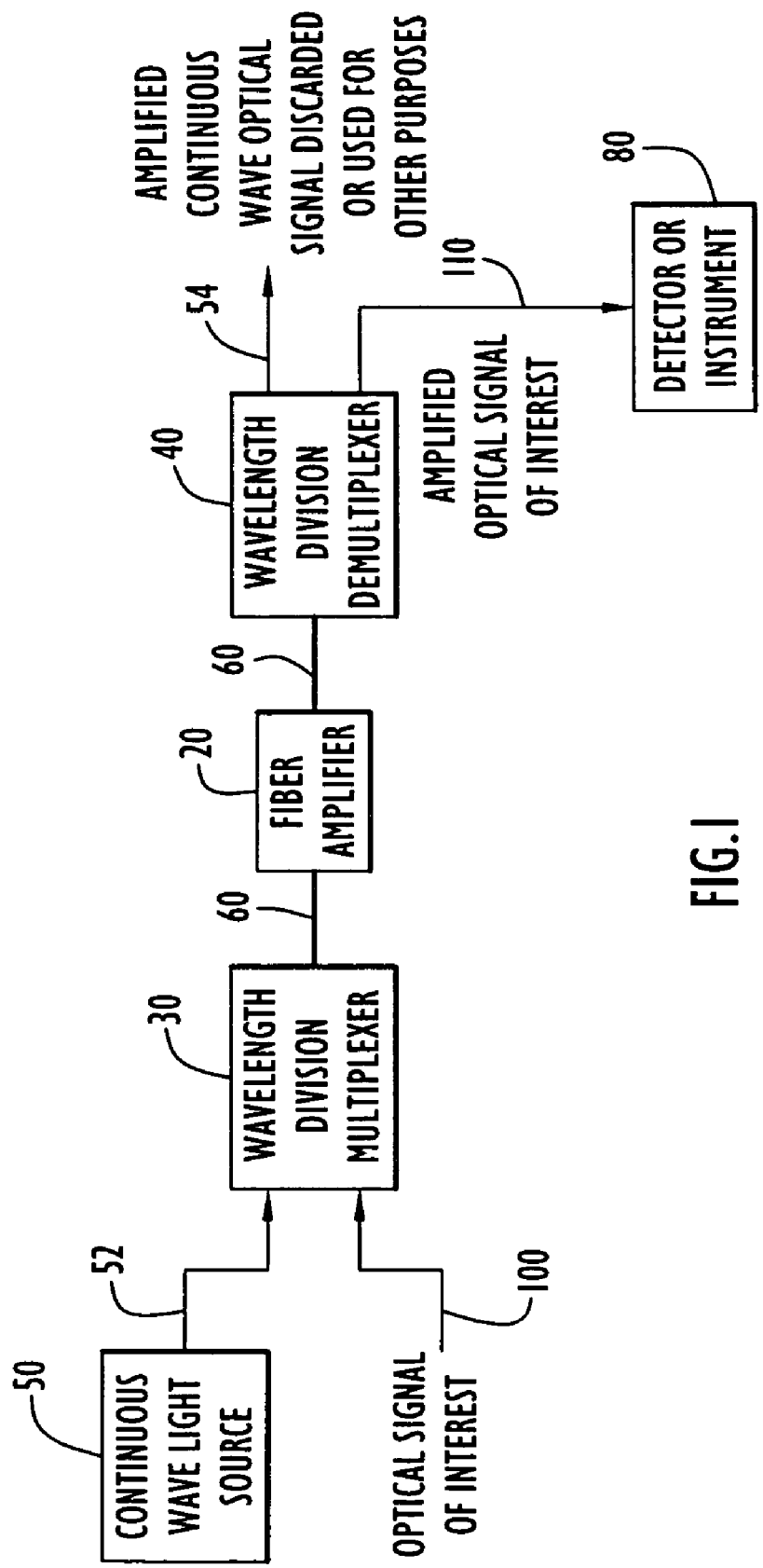
FIG. 1 is a block diagram of a fiber amplifier system according to an embodiment of the invention.

Referring first to FIG. 1, a block diagram is shown of a fiber amplifier system 10 according to an embodiment of the invention. The fiber amplifier system 10 comprises a fiber amplifier 20, a wavelength division multiplexer (WDM) 30, a wavelength division de-multiplexer 40 and a continuous wave light source 50. The output of the WDM 30 is coupled to one end of an optical fiber 60. The other end of the optical fiber 60 is coupled to an input of the fiber amplifier 20. Optical fiber 60 on the output side of the fiber amplifier 20 is connected to the wavelength division de-multiplexer 40. The fiber amplifier 20 may be an Erbium Doped Fiber Amplifier (EDFA), or Ytterbium-doped, Neodymium-doped, or any other doped fiber amplifier that suffers from noise due to the probability of spontaneous emission. The continuous wave light source 50 generates a continuous wave optical signal 52 that is coupled to the WDM 30. An optical signal of interest 100 (to be amplified by the fiber amplifier 20) is also coupled to the WDM 30. The continuous wave light source 50 may be a laser or light emitting diode (LED), for example.

Fiber amplifiers, such as EDFAs, have become an enabling technology for infrared laser applications that require power levels in excess of 20 mW. Most of their use has been limited to high power applications. These fiber amplifiers can also be applied to lower level signals but they have seen limited use due to issues with noise. If the signal to be amplified has a loss of signal, even for a brief period of time, the output of the system can become noisy. This is especially true for applications involving optical communications, where there are flashes of light representing data separated by brief periods of no light which also represents data. The noise in the fiber amplifier will corrupt the data. Additionally, there has been considerable interest in the ability to operate an fiber amplifier using multi-mode optical fibers. Traditionally, single-mode fibers are used. With a multi-mode fiber, a laser signal will not "fill" the core of the fiber, and the dark regions of the core will leave the EDFA in a state that no longer provides stimulated emission. Instead, the emission becomes spontaneous and therefore noisy.

According to an embodiment of the invention, the continuous wave light source 50 generates the continuous wave (CW) optical signal 52 that serves to "clean up" the carriers that are likely to otherwise spontaneously emit. The CW optical signal 52 is within the amplification band of the fiber amplifier 20, but outside of the bandwidth of the optical signal of interest 100. The output of the fiber amplifier system 10 is the amplified optical signal of interest 110 which may be coupled to a detector or instrument 80 that conducts further processing of the amplified optical signal of interest 110.

Figure 2:
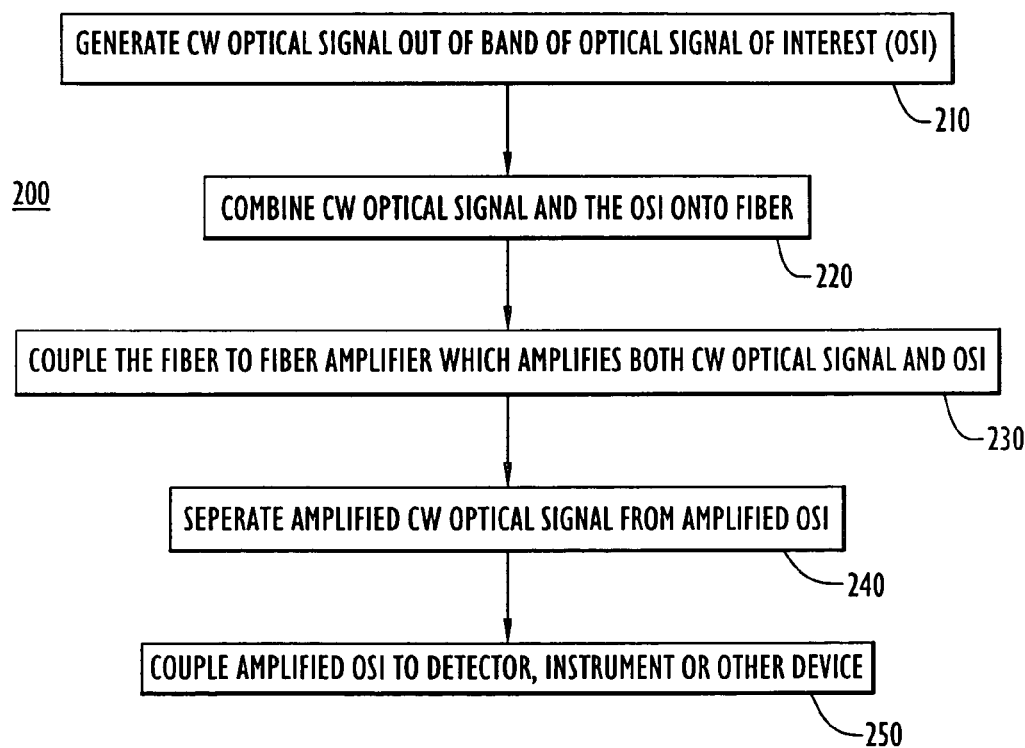
FIG. 2 is a flow chart depicting a method for reducing noise in a fiber amplifier according to an embodiment of the invention.

With reference to FIG. 2 in conjunction with FIG. 1, a method 200 of reducing noise produced by the fiber amplifier 20 in the fiber amplifier system 10 is described. The optical signal of interest (OSI) 100 that is to be amplified by the fiber amplifier 20 is coupled to the WDM 30. At 210, the continuous wave light source 50 generates the CW optical signal 52 which is also supplied to the WDM 30. Again, the CW optical signal 52 is outside the band of the OSI 100, but within the amplification band of the fiber amplifier 20. For example and not by way of limitation, the OSI 100 is an optical signal centered at 1545 nm and the CW optical signal produced by a laser or LED is a CW optical signal at 1535 nm. At 220, the WDM 30 combines the OSI 100 and the CW optical signal 52 and the combined signals are couple over the optical fiber 60 to the fiber amplifier 20 at 230. As the CW optical signal 52 travels down the optical fiber 60, it stimulates the emission of other photons of equivalent energy. This creates a condition in which the optical energy in the optical fiber 60 amplified by the fiber amplifier 20 always has a signal. The signal traveling in the optical fiber that is intended to be amplified, i.e., the OSI 100, will still be amplified, but it will be amplified according to the ratio of its own power level or intensity and the power level or intensity of the CW optical signal 52. At 240, the wavelength division de-multiplexer 40 de-multiplexes the amplified OSI 110 from the amplified CW optical signal 54 using conventional WDM de-multiplexing techniques. At 250, the amplified OSI 110 may then be coupled to an optical detector or instrument 80 depending on the particular application or use for the amplified OSI 110. The amplified CW signal 54 may be discarded. Alternatively, the amplified CW signal 54 may be used for performing functions such as power monitoring of the OSI, controlling the gain of the fiber amplifier, 20 or other functions.

Whenever the level of the OSI 100 is very low or zero (e.g., it is in an "off" state), the CW optical signal 52 will stimulate the ions in the fiber amplifier 20, thereby assuring that (essentially) all ion emissions remain stimulated, thus keeping the noise associated with such spontaneous photon emissions very low. In other words, the method 200 assures that as many photons as possible that are released from the ions are released by stimulation and not by spontaneous emission.

It is well known that all lasers exhibit spontaneous emission. In fact, any laser amplifier will increase the signal-to-noise ratio (SNR) of the signal being amplified. This increase in SNR is commonly expressed as a ratio of the input SNR divided by the output SNR, and is called the noise figure. The minimum theoretical noise figure ratio is a factor of 2 (3 dB). In practice, this factor is higher, with many commercial amplifiers having a noise figure of about 6 dB. This value assumes an input signal is present. In the absence of an input signal, an EDFA will produce noise alone creating a SNR of zero. For optical communications, this noise will be measured by the receiver and a data bit slot that should nominally have no signal could have substantial signal, and thereby produce an error. In this case, the signal level is essentially zero but the noise level is measurable. The benefit that is realized by the use of the additional CW light source is a reduction in the probability of spontaneous emission in the absence of an optical signal of interest.

Figure 3:
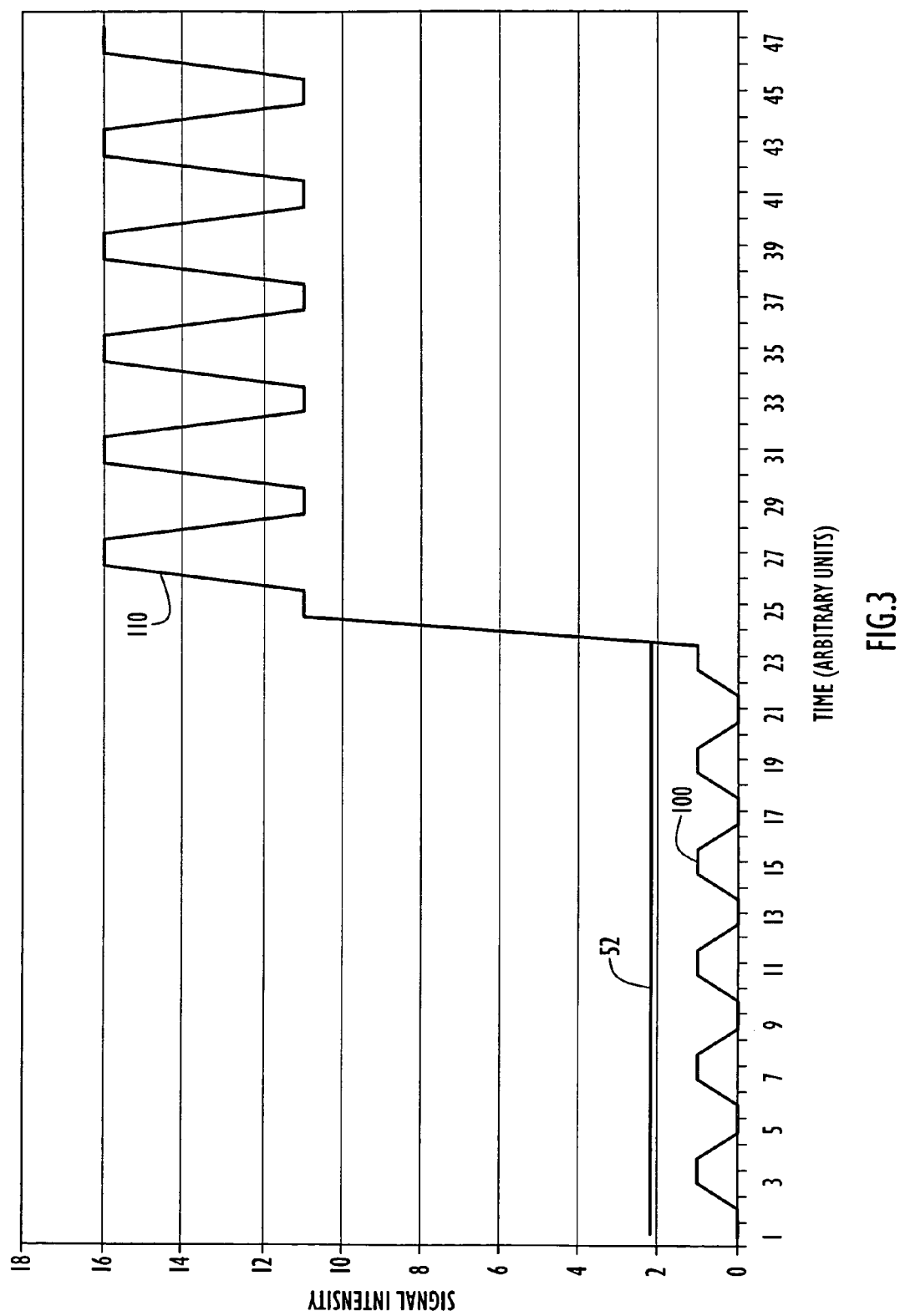
FIG. 3 shows plots of an exemplary optical signal of interest and an exemplary continuous wave optical signal to depict operation of the system and method according to embodiments of the invention.

Reference is now made to FIG. 3. FIG. 3 shows a plot of the signal intensity of an exemplary CW optical signal 52 and an exemplary OSI 100 before the fiber amplifier 20 and the amplified CW optical signal 54 and the amplified OSI 110 after the fiber amplifier 20. The CW optical signal 52 and OSI 100 are shown before the time marked 24. The output of the fiber amplifier is on the right side of time mark 25, showing the combined signal strength of the amplified OSI 110 and the amplified CW signal 54. Noteworthy is that the signal intensity of the amplified OSI 110 is substantially increased such that the SNR is significantly improved.

Historically, it has been difficult to manufacture a low-noise fiber amplifier (pre-amplifier) that operates on multi-mode light. The problem that arises is noise due to modal dispersion. In a multi-mode fiber, the core of the fiber is never fully illuminated by a single laser. Rather, there are regions that are dark and regions that are bright. The regions that are bright will stimulate emission and be amplified, but the dark regions will not and only spontaneous emission will occur. To alleviate this problem, the CW light source 50 may be a broad-band continuous wave optical source that produces incoherent light as the CW optical signal. Such a CW light source will generate a CW optical signal that fills the fiber core with energy everywhere, and assures maximum probability of stimulated emission.

In the case of a signal in a multi-mode fiber, the core is much larger, and a laser signal will nominally be confined to various regions of the core, but will not be uniformly spread out over the full area of the fiber core. This non-uniform intensity distribution is commonly referred to as speckle, and is characterized by dark regions and bright regions within the fiber core. The locations of the dark and bright regions are complimentary to one another and are constantly changing in time, possibly at frequencies in tens of Hertz. The distribution of intensities over the fiber core presents significant design challenges for a traditional fiber amplifier, such as an EDFA. On the one hand, there are very bright regions, and if the EDFA gain is designed for the bright regions there will be an adequate population for upper energy states for the bright regions but the dark regions of the fiber would exhibit excessive spontaneous emission. If the EDFA is designed for the dimmer regions, the number of upper energy states is not sufficient for the bright regions and these regions would then be attenuated thereby reducing the effective input signal to noise ratio and consequently increasing the output noise level. The problem that dominates this issue is the relative intensity between the brightest of the bright regions and the dimmest of the dim regions. In practice, this ratio can be many orders of magnitude.

By providing a separate CW optical signal in the multi-mode optical fiber (i.e., optical fiber 60 shown in FIG. 1) that fills the entire fiber core essentially uniformly, the average intensity of the OSI can have a much lower intensity than the CW optical signal. Therefore, the brightest regions of the fiber are not orders of magnitude brighter than the dim regions. The ratio in this case may be a number that is only between 1 and 2, making the trade-off between excessive upper energy states (which may produce excessive spontaneous emission) and a reduced number of upper energy states (which may produce excessive signal attenuation), a much easier trade-off to work with. With the CW optical signal active in the optical fiber, there is a preponderance of states that will emit coherently with the CW optical signal if the OSI is not present. Yet, the gain is largely unaltered. In the case of a gain-flattened fiber amplifier, such as an EDFA, the amplifier will increase the signal level of both signals (CW optical signal and the OSI) by the same ratio. For example, if the OSI needs 30 dB of gain, the fiber amplifier can be designed so as to be optimized for the CW optical signal to provide 30 dB of gain. When the CW optical signal is combined with the OSI prior to amplification, it will also experience nearly 30 dB of gain since its signal level is smaller than that of the CW signal.

Due to the need for an added CW optical signal and since the CW optical signal has a higher intensity than the signal of interest, the gain of the CW signal will require proportionately more power input to generate the needed gain for the OSI. However, there are applications for the techniques according to embodiments of the present invention are useful.

Figure 4:
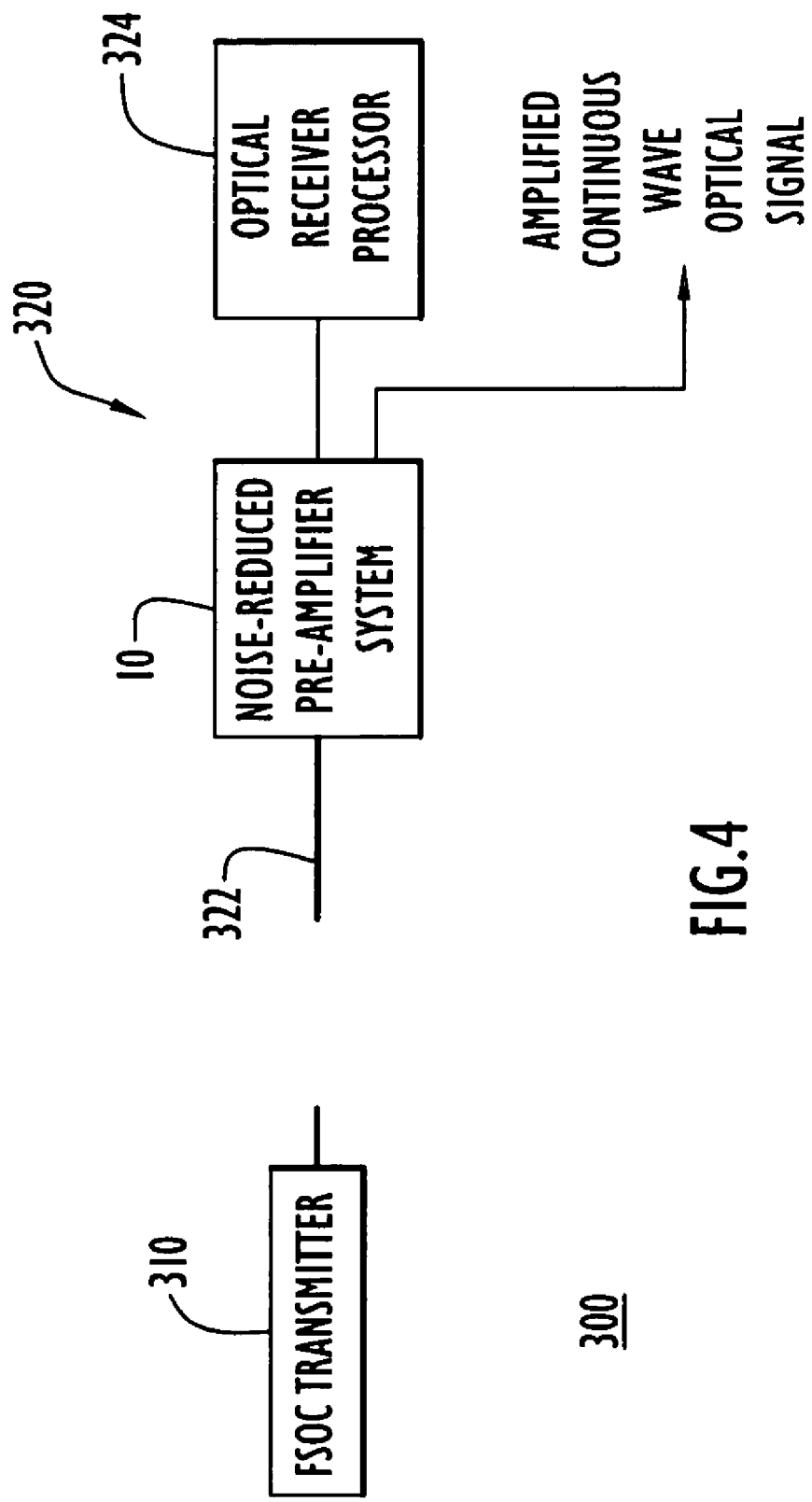
FIG. 4 is a block diagram showing an exemplary use of the fiber amplifier noise reduction techniques in a pre-amplifier of a free space optical communication system, according to an embodiment of the invention.

Reference is now made to FIG. 4 which illustrates a Free-Space Optical Communication (FSOC) system 300. The system 300 comprises a FSOC transmitter 310 that transmits a beam over free space to a receiver 320. The receiver 320 comprises a multi-mode optical fiber 322 that is coupled to a noise-reduced pre-amplifier system 10 that is based on the techniques described herein and shown in FIGS. 1 and 2. An optical receiver processor 324 is coupled to an output of the pre-amplifier system 10. If 10 dB of additional power for the system 300 is needed, the power can be added at the transmitter 310 or at the pre-amplifier 320, or some portion at both ends of the FSOC communication link. For example, a FSOC link may require 1 Watt of transmitter power in order to operate. The pre-amplifier system 10 may apply 20 dB of gain to the received optical signal. By implementing the techniques according to embodiments of the invention described herein, the transmitter 310 would only need to output 10 mW of power, rather than 1 Watt, a savings of 99% power on the transmit side.

At the receiver 320, the CW optical signal generated in the pre-amplifier system 10 may, in one embodiment, nominally be a factor of 100 times the receiver signal power of −45 dBm, or approximately 30 μW. With 20 dB of gain, the power level of the CW optical signal is increased to 3 mW. Thus, without the pre-amplifier system 10, the total system optical power would be 1 W in this example. With the pre-amplifier system 10, the total optical power is reduced to 13 mW (10 mW at the transmitter, 3 mW at the receiver), for an overall link power savings of 987 mW, or a 98.7% reduction in total power, end-to-end (not considering possible differences in efficiency for the various components).

The system and methods described herein may be embodied in other specific forms without departing from the spirit or essential characteristics thereof. The foregoing embodiments are therefore to be considered in all respects illustrative and not meant to be limiting.

What is claimed is:

1. A method for reducing noise in a fiber amplifier with respect to an optical signal of interest to be amplified by the fiber amplifier, comprising:
   a. generating a broad-band continuous wave incoherent optical signal having a bandwidth that is outside of the bandwidth of the optical signal of interest;
   b. combining the broad-band continuous wave incoherent optical signal with the optical signal of interest into a multi-mode optical fiber so that the broad-band continuous wave incoherent optical signal uniformly fills substantially an entire core of the multi-mode optical fiber; and
   c. amplifying the optical signal of interest and the broad-band continuous wave incoherent optical signal in the multi-mode optical fiber with the fiber amplifier, wherein the broad-band continuous wave incoherent optical signal increases generation of photos by stimulation so that as many photons as possible that are released from ions in the fiber amplifier are released by stimulation and not by spontaneous emission when a level of the optical signal of interest is very low or zero.

2. The method of claim 1, wherein combining comprises coupling the broad-band continuous wave incoherent optical signal and the optical signal of interest to a wavelength division multiplexer and connecting an output of the wavelength division multiplexer to one end of the multi-mode optical fiber and connecting another end of the multi-mode optical fiber to an input of the fiber amplifier.

3. The method of claim 1, and further comprising separating the amplified signal of interest output by the fiber amplifier from the amplified broad-band continuous wave incoherent optical signal.

4. The method of claim 3, wherein separating comprises coupling an output of the fiber amplifier to a wavelength division de-multiplexer that de-multiplexes the amplified optical signal of interest and the amplified broad-band continuous wave incoherent optical signal.

5. The method of claim 1, wherein generating comprises generating the broad-band continuous wave incoherent optical signal so as to have a bandwidth that is within an amplification band of the fiber amplifier.

6. The method of claim 1, and wherein generating comprises generating the optical signal of interest with an average intensity that is substantially lower than an intensity of the broad-band continuous wave incoherent optical signal.

7. A method for pre-amplifying an optical signal transmitted across free space, comprising the method of claim 1, wherein the optical signal of interest is a received free space optical signal.

8. The method of claim 1, wherein generating comprises generating the broad-band continuous wave incoherent optical signal with an intensity such that brighter regions of the multi-mode optical fiber are not orders of magnitude brighter than dimmer regions in the multi-mode optical fiber.

9. The method of claim 1, wherein generating comprises generating the optical signal of interest and the broad-band continuous wave incoherent optical signal such that a ratio of intensity of brightest regions to dimmer regions in the multi-mode optical fiber is between 1 and 2.

10. A fiber amplifier system comprising:
    a. a broad-band continuous wave optical source that produces a broad-band continuous wave incoherent optical signal having a bandwidth that is outside the bandwidth of an optical signal of interest;
    b. a wavelength division multiplexer receiving as input said optical signal of interest and said broad-band continuous wave incoherent optical signal and that combines the optical signal of interest and the broad-band continuous wave incoherent optical signal for output;
    c. a multi-mode optical fiber coupled to an output of the wavelength division multiplexer to receive the combined optical signal of interest and broad-band continuous wave incoherent optical signal such that the broad-band continuous wave incoherent optical signal uniformly fills substantially an entire core of the multi-mode optical fiber; and
    d. a fiber amplifier coupled to the multi-mode optical fiber to amplify the optical signal of interest and the broad-band continuous wave incoherent optical signal, wherein the broad-band continuous wave incoherent optical signal increases generation of photons by stimulation so that as many photons as possible that are released from ions in the fiber amplifier are released by stimulation and not by spontaneous emission when a level of the optical signal of interest is very low or zero.

11. The system of claim 10, and further comprising a wavelength division de-multiplexer that is coupled to an output of the fiber amplifier and that separates the amplified optical signal of interest from the amplified broad-band continuous wave incoherent optical signal.

12. The system of claim 10, wherein the broad-band continuous wave optical source generates the broad-band continuous wave incoherent optical signal so as to have a bandwidth that is within an amplification band of the fiber amplifier.

13. The system of claim 12, wherein the optical signal of interest has an average intensity that is substantially lower than an intensity of the broad-band continuous wave incoherent optical signal.

14. A pre-amplifier for use in a receiver of a free space optical communication system, wherein the pre-amplifier comprises the fiber amplifier system of claim 10 and wherein the optical signal of interest is a received free space optical signal.

15. The system of claim 10, wherein the broad-band continuous wave light source generates the broad-band continuous wave incoherent optical signal such that a ratio of intensity of brightest regions to dimmer regions in the multi-mode optical fiber is between 1 and 2.

16. A method for reducing noise produced by a fiber amplifier by combining into a multi-mode optical fiber an optical signal to be amplified with a broad-band continuous wave incoherent optical signal that uniformly fills substantially an entire core of the multi-mode optical fiber so that the continuous wave optical signal increases generation of photons by stimulation and not by spontaneous emission when a level of the optical signal of interest is very low or zero.

17. The method of claim 16, wherein combining comprises combining the broad-band continuous wave incoherent optical signal that has a bandwidth that is outside of the bandwidth of the optical signal to be amplified.

18. The method of claim 16, wherein combining comprises combining the broad-band continuous wave incoherent optical signal that is within an amplification band of the fiber amplifier.

19. The method of claim 16, and further comprising generating the broad-band continuous wave incoherent optical signal with an intensity such that brighter regions of the multi-mode optical fiber are not orders of magnitude brighter than dimmer regions in the optical fiber.

20. A method for pre-amplifying an optical signal transmitted across free space, comprising the method of claim 16, wherein the optical signal of interest is a received free space optical signal.

21. The method of claim 16, and further comprising generating the broad-band continuous wave incoherent optical signal with an intensity such that brighter regions of the multi-mode optical fiber are not orders of magnitude brighter than dimmer regions in the multi-mode optical fiber.

22. The method of claim 16, wherein generating comprises generating the optical signal of interest and the broad-band continuous wave incoherent optical signal such that a ratio of intensity of brightest regions to dimmer regions in the multi-mode optical fiber is between 1 and 2.

* * * * *